Patented June 20, 1933

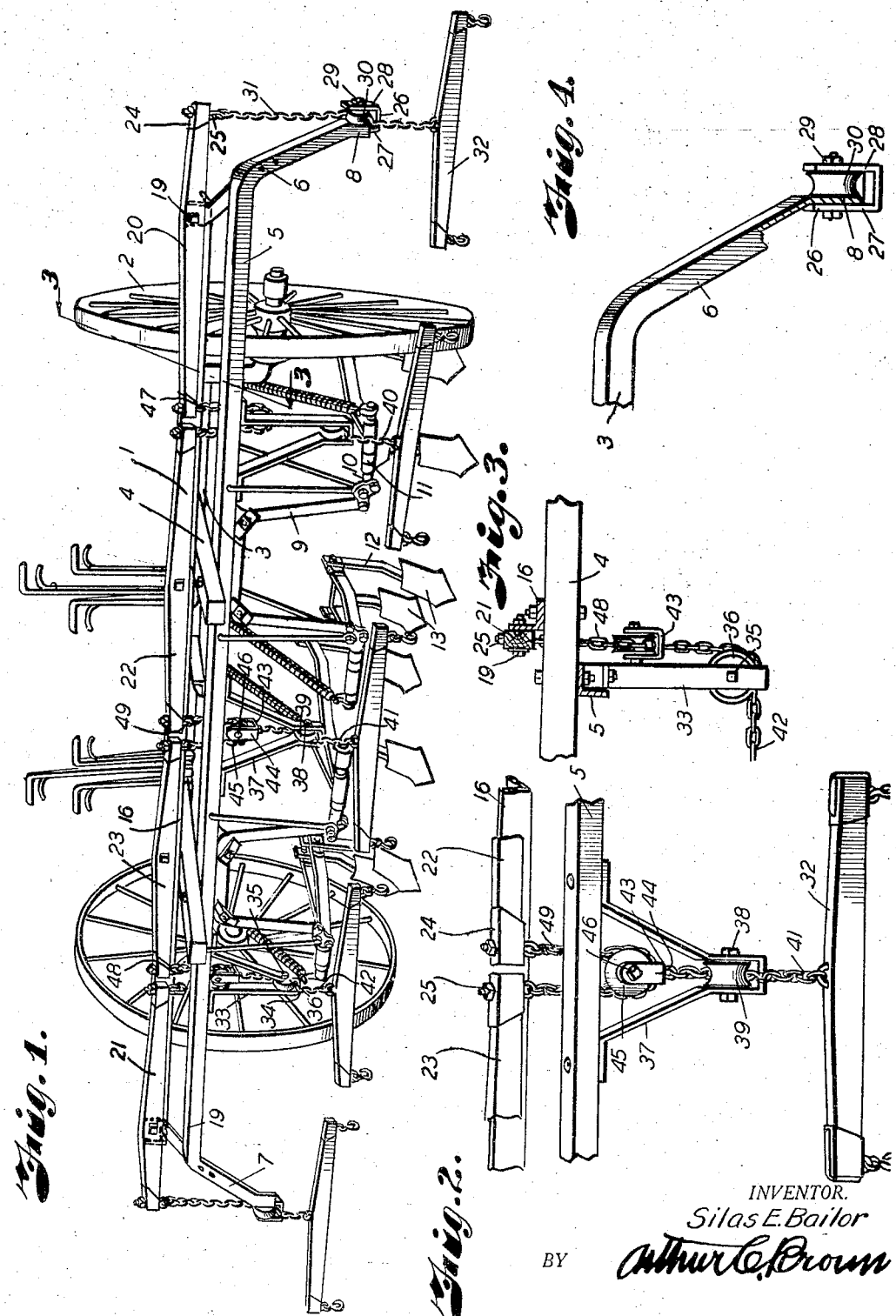

1,915,145

UNITED STATES PATENT OFFICE

SILAS E. BAILOR, OF DILL, OKLAHOMA

FIVE-HORSE DRAFT EQUALIZER

Application filed June 23, 1930. Serial No. 463,256.

My invention relates to cultivators and more particularly to draft gear for agriculture implements of this character, adapted to equalize the pull of two or more draft animals.

Draft equalizers have been heretofore provided for two row cultivators including vertically pivotal horizontal transverse evener bars supported by a transverse beam whereby the draft of outside horses may be equalized with the draft of an inside horse, but said devices are not applicable to teams of more than three horses.

The principal objects of my invention therefore are to provide a draft equalizing device adapted for employment when more than three horses are used to draw an implement, to simplify the construction of draft equalizers whereby relatively strong and rigid hitches may be provided having a number of hitch bracket members, and particularly to provide a five horse draft equalizer in which the pull of outside horses traveling between the outer rows of plants beyond the sides of the cultivator is transmitted directly to a main equalizing beam that supports the several evener bars for the hitches of inside horses.

It is also an object of the invention to provide a draft rigging wherein the equalizer bars are positioned above the growing plants and at the same time provide a low point of draft in line with the cultivator plows to eliminate down draft and the necessity of the usual tongue truck.

In accomplishing these and other objects of my invention, I have provided improved details of structure, the preferred forms of which are illustrated in the accompanying drawing, wherein:

Fig. 1 is a perspective view of a two-row cultivator equipped with a five horse hitch including draft equalizing features constructed in accordance with my invention.

Fig. 2 is an enlarged detail perspective view of an intermediate portion of the equalizer illustrating the connection of inner ends of evener bars with a singletree.

Fig. 3 is a section on line 3—3, Fig. 1.

Fig. 4 is a fragmentary perspective view of one end of the equalizer adapted to receive a singletree connecting a chain.

Referring in detail to the drawing:

1 designates generally a cultivator frame mounted on wheels 2 and including transverse members 3 and longitudinal members 4.

A transverse equalizing beam 5 is secured to the frame having opposite ends extending substantially laterally from the cultivator and provided with angular, outwardly, downwardly extending arms 6 and 7 having vertical end portions 8 for supporting draft gear elements presently described. The beam 5 is preferably adapted to assist in supporting arch-like brackets 9 having lateral spindles 10 at their lower ends to receive pivot castings 11 to which shovel beams 12 may be secured for supporting gangs of shovels 13 in suitably laterally spaced relation to provide the operating elements of the cultivator, the beam however being elongated and further adapted as presently described, to comprise the draft equalizing member.

Mounted on the upper face of the longitudinal members and rearwardly of the beam 5 is a transverse angle bar 16 provided with pivot pins 19 for supporting evener bars 20 and 21 adjacent their outer ends and centrally pivoted intermediate evener bars 22 and 23 in the illustrated application of the invention. The eveners have metal reinforcing caps 24, and eyebolts 25 are mounted in the caps for supporting draft chains.

The ends of the angle bar terminate adjacent the angular arms of the beam 5 and the end evener bars 20 and 21 have pivotal mounting on said bar at points approximately one-third their length from the eyebolts to cause the outer ends of said bars to extend slightly beyond the portions 8 of the angular arms 6 and 7.

Brackets 26 having inner legs 27 mounted in the channels of the portions 8 and outer legs 28 spaced from the vertical outer faces of the portions are attached to the webs of said portions by bolts 29 which support rollers or pulleys 30 between said webs and said legs 28 in substantial alignment with the outer eyebolts.

Chains 31 having inner ends secured to the eyebolts at the outer extremities of the end evener bars 20 and 21 and running on the rollers are retained by the webs of the brackets 26 and have outer ends attached to outside singletrees 32.

Two hitching brackets 33 fixed to the beam 5 in spaced relation with the angular arms 6 and 7 respectively, each comprising diverging legs having parallel portions connected and spaced by webs 34 are provided with pins 35 for supporting rollers 36 within the housing-like brackets, and a center hitching bracket 37 having diverging legs and parallel portions provided with a pin 38 forms a housing and support for a center roller 39.

Chains 40, 41 and 42 having outer ends connected to intermediate singletrees run over said rollers 36 and 39, and have inner ends connected to webs 43 of clevis-like forks 44. Rollers 45 are mounted between the arms of the forks on pins 46. Chains 47 and 48 are connected respectively to the inner ends of the end evener bars 20 and 21, and to the outer ends of intermediate evener bars 22 and 23, and run on the rollers 45 connected to singletree chains 40 and 41, while a chain 49 running on the roller 45 of the center singletree chain has ends connected to the adjacent inner ends of the two intermediate evener bars.

The angle bar 16 is adapted to support the evener bars substantially in tangential alignment above the rollers and the rollers bend the chains into vertical paths in front of the beams whereby the chains may operate freely vertically over the rollers responsively to different pull exerted by draft animals.

In using apparatus constructed as described, the outside horses hitched to the end singletrees exert a horizontal pull on the outer ends of the chains and a downward pull on the end evener bars, the intermediate horses likewise exerting downward pull on the evener bars. The pulls of the several horses are equalized due to the fact that the outside horses pull against lever arms having one-third the length of the lever arms on the opposite sides of their pivots, the two horses adjacent the outside horses having twice the leverage on the end evener bars since each is required to share equally with the inside horse, the load on the intermediate evener bars.

What I claim and desire to secure by Letters Patent is:

1. A draft equalizer of the character described in combination with a frame having longitudinal members, a transverse beam secured to said members having a horizontal portion and downwardly extending end arms, a transverse bar secured to said members in spaced parallel relation with said beam, outside aligned evener bars having pivotal mounting adjacent their outer ends on the ends of the transverse bar and projecting outwardly beyond said horizontal portion, a pair of inside evener bars having central pivotal mounting on the transverse bar in alignment with the outside evener bars, a plurality of depending brackets carried by said transverse beam, rollers supported by the brackets beneath the ends of said evener bars, flexible members running on said rollers and connected to the ends of said evener bars, and bracing members connecting the outer ends of the transverse bar and beam and cooperating with the longitudinal members so that the transverse bar stiffens the beam against leverage acting on said brackets when draft power is applied to said flexible members.

2. A draft equalizer comprising a frame having longitudinal members, a beam having downwardly extending arms at its ends carried by said members, a transverse bar carried by said members parallel to and spaced rearwardly of said beam, outside evener bars pivotally mounted on the front of said transverse bar, the point of pivotal mounting being nearest their outer ends, a pair of inside evener bars pivotally mounted at their centers on the front of said transverse bar, flexible members connecting adjacent ends of said evener bars, rollers located on said flexible members, a plurality of rollers supported by said beam and in tangential alignment with the ends of said evener bars, a flexible member secured to said first mentioned rollers and passing beneath certain of said last mentioned rollers, a flexible member secured to the outer end of each of said first mentioned evener bars and passing beneath certain of said last mentioned rollers, a singletree secured to each of said last mentioned flexible members, and means connecting the ends of the transverse bar with said beam and cooperating with the longitudinal members so that the transverse bar stiffens the beam against leverage acting on said last named rollers when draft power is applied to said singletrees.

In testimony whereof I affix my signature.

SILAS E. BAILOR.